Oct. 21, 1958 — G. B. BENANDER — 2,857,173

VEHICLE-MOUNTED SHOE SCRAPER

Filed Sept. 20, 1956

Inventor:
George B. Benander,
by Richard L. Caelin
His Attorney

United States Patent Office 2,857,173
Patented Oct. 21, 1958

2,857,173

VEHICLE-MOUNTED SHOE SCRAPER

George B. Benander, Oaklawn, R. I.

Application September 20, 1956, Serial No. 610,996

9 Claims. (Cl. 280—164)

The present invention relates to a shoe scraper and particularly to a novel hinge construction for connecting the scraper at one end to a swinging door of a vehicle while the opposite end is attached to the door sill.

In the past decade the population of this country has been shifting to the suburban areas surrounding the large cities. Many new homes are not provided with paved driveways nor are they located in areas with adequately paved roads. A constant problem for owners of automobiles is the dirt, mud, snow and water which accumulates on the floor of the vehicle. This problem is more serious in the expensive automobiles having carpets rather than rubber mats. The usual practice is for the owner to purchase small rubber mats for the front and rear floors, which may be taken out and shaken to remove the loose dirt accumulation without sweeping or vacuuming the floor.

The several embodiments of the shoe scraper of my invention were conceived to enable the passengers of a vehicle to clean the bottoms of their shoes in a matter of seconds before entering the vehicle. This is accomplished by providing a shoe scraper that is pivotally connected at one end to the lower edge of a door and at the opposite end to the door sill. The scraper is attached to the door and door sill in such a manner that when the door is fully open, the dirt and other material scraped from the shoes will fall directly to the ground and will not accumulate on the scraper or be carried into the automobile.

One of the main problems solved by my invention is the method of reducing the effective length of the scraper between the two pivotal connections at its ends so that the scraper will fold neatly against the inner side of the door when the door is closed.

Accordingly, the principal object of this invention is to provide a shoe scraper of simple design so that it may be pivotally mounted on a vehicle between the lower edge of a swinging door and the door sill without major alterations to the vehicle.

A further object of this invention is to provide a shoe scraper for a vehicle so that it may be pivotally attached to the door and door sill in such a manner that the dirt removed from the shoes will fall to the ground.

A further object of this invention is to provide a vehicle-mounted shoe scraper which may be assembled to the door and door sill of the vehicle without the use of special tools, and which will fold neatly against the inner side of the door as the door is being closed.

A still further object of this invention is to provide a shoe scraper that may be pivotally mounted at one end to the lower edge of a swinging door of a vehicle while the other end of the scraper is pivotally attached to the door sill; means being provided to reduce the effective spacing between the said pivotal connections so that the scraper will hug the inner surface of the door when the door is closed.

My invention will be better understood from the following description taken in connection with the accompanying drawing, and its scope will be pointed out in the appended claims.

Figure 1:
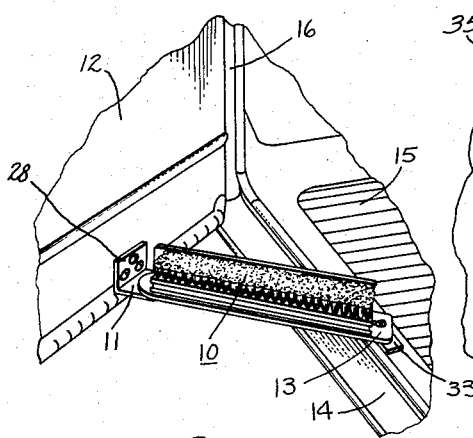
Figure 1 is an isometric view at the driver's side of an automobile showing the front door in the fully opened position and the preferred embodiment of my shoe scraper invention pivotally mounted at one end to the lower edge of the door while at the other end it is pivotally mounted to the door sill.

Referring in detail to the drawing, and in particular to the preferred embodiment of Figures 1-3, 10 represents the shoe scraper which is to be pivotally attached as at 11 to the lower edge of the swinging door 12, while at the opposite end 13 of the scraper a pivotal connection is made o the door sill 14 of a vehicle such as an automobile, truck, or house trailer. Figure 1 shows the door 12 at the driver's seat of an automobile but it should be understood that this invention may be used at each of the four swinging doors for use by all of the passengers. Further explanation of the structure shown in Figure 1 would include the floor mat 15 and the vertical door post 16 from which the door 12 is supported.

Figure 3:
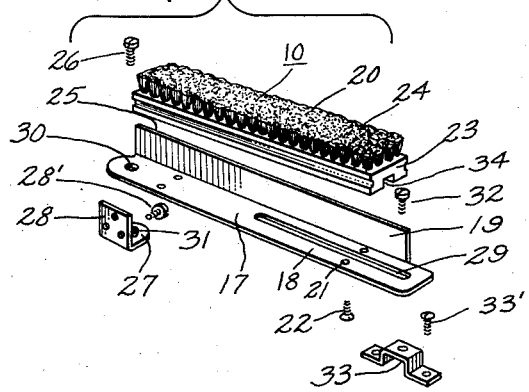
Figure 3 is an exploded view of the different elements which comprise the shoe scraper and hinge connections of Figure 1.

An understanding of the shoe scraper 10 may be had when considering the exploded view of the individual parts of Figure 3. First, there is an angle bar 17 of L-section with a base 18 and a vertical side flange 19. A brush 20 is adapted to be fastened on the angle bar 17. Screw openings 21 are formed in the base 18 so that screws 22 may extend upwardly through the base and be threaded into a wooden block 23 of the brush in which the bristles 24 are supported. The side flange 19 of the angle bar has an upper edge 25 which is generally flush with the bristles 24 so that the bottom of the shoe will be first scraped by the flange or scraper bar 19 and then brushed by the bristles 24 of the brush.

The pivotal connection at the end 11 of the scraper 10 as shown in Figure 1 is established by a screw fastener 26 which joins the base 18 to an extension 27 of an angle bracket 28 fastened by means of screws 28' to the lower edge of the door 12. A slightly enlarged opening 30 is made adjacent the left-hand end of the base 18 so that it will overlie a threaded hole 31 in the extension 27 of the angle bracket 28. The screw 26 is threaded into the hole 31 so that it will serve as a vertical pivot means for the scraper 10.

At the opposite end of the angle bar 17 a longitudinally extending slot 29 is made in the base 18 so that a screw fastener 32 may extend downwardly therethrough and be fastened to an underlying bracket 33 which is fastened to the door sill 14 or adjacent floor structure such as by screws 33'. Since the head of the pivot screw 32 extends above the base 18, a notch or depression 34 is made in the block 23 of the brush for the full length of the slot 29 to permit a relative sliding and turning action between the pivot screw 32 and slot 29.

Figure 2:
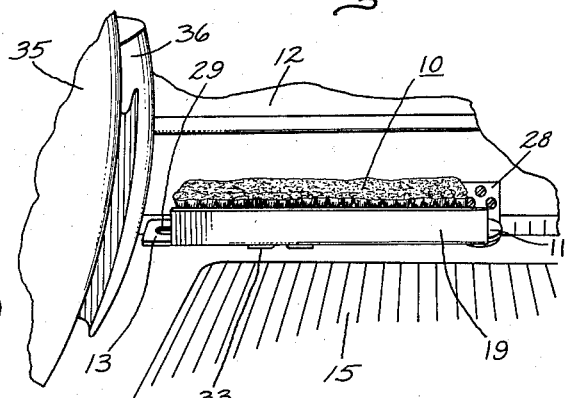
Figure 2 is a view from within the automobile showing the door in the closed position and the shoe scraper neatly arranged adjacent the inner side of the door so that it will not interfere with the feet of the driver.

It should be understood that a sliding and pivotal hinge action is provided as at 13 in Figure 1 so that when the door 12 is being closed the pin 32, attached to the door sill bracket 33, will slide in the slot 29 for approximately the first half of the movement of the door. Then the scraper 10 will pivot about the pin 32 until it assumes the final position shown in Figure 2. This figure gives a showing from within the car when the door is closed. The removable front seat is shown at 35 which nests in the stationary seat frame 36. This Figure 2 is an excellent illustration showing how the scraper 10 is folded against the inner surface of the door 12 in an inconspicuous manner.

Figure 4:
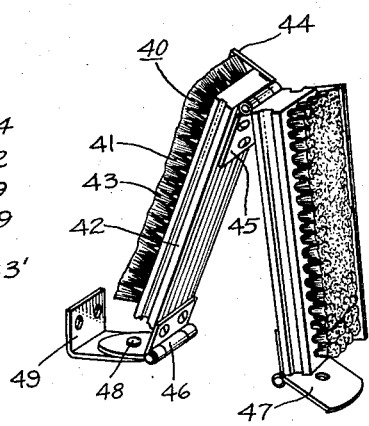
Figure 4 is an isometric view of a second modification of my generic invention wherein the two end connections pivot about transverse axes while the scraper has a third transverse hinge connection adjacent the center of the scraper to allow the scraper sections to fold together in a vertical plane and reduce the effective length between the two endmost hinge connections as the door is closed.

The second modification of Figure 4 shows a sectional shoe scraper 40 where the sections are hinged together adjacent the center about a transverse axis on the underside of the scraper, thereby allowing the sections of the scraper to fold together in a vertical plane. Each section of the scraper comprises a brush 41 with a wooden block 42 and bristles 43. A scraper bar 44 is fastened to a side of each block 42 so that the scraper 40 will include both a brush 41 and a scraper bar 44. A suitable hinge portion 45 is attached to the underside of each block 42 thereby serving as the pivotal connection between the scraper sections. A second hinge means 46 is fastened on one scraper section for attachment to a vertical pivot pin 48 on an angle bracket 49 that is arranged on the lower edge of the door 12, while a third hinge 47 will be connected by a suitable screw fastener to a bracket such as 33 of Figure 3.

In this second modification of Figure 4 the two scraper sections 41 will be in a horizontal position when the door is fully open; in a manner similar to a toggle joint, and thereby serve the additional function of holding the door open against inadvertent closing. However, before closing the door 12 it will be necessary to raise the hinge connection at 45 before the relative distance between the hinges 46 and 47 may be reduced as the door 12 is closed and the scraper sections fold in a vertical plane.

Figure 5:
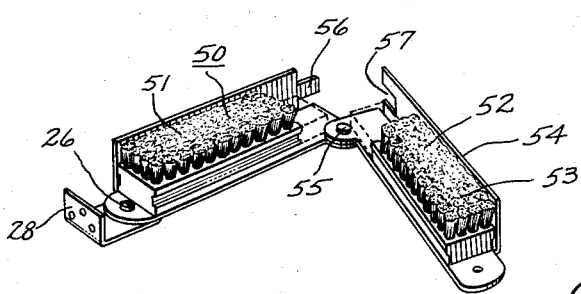
Figure 5 is an isometric view of a third modification of my generic invention wherein the scraper has two vertical hinge connections at the end and a third vertical pivotal axis adjacent the center so that the scraper sections may fold together in a horizontal plane to lie against the inner surface of the door when it is closed.

The third modification of Figure 5 has some of the characteristics of both the first and second modifications. It is similar to the first modification because it is pivotally supported between the door and door sill by means of vertical pivots. It is likewise similar to the second modification of Figure 4 because it has two scraper sections pivoted adjacent their center so that they may be folded together. However, this folding action is in a horizontal plane rather than a vertical plane as in Figure 4. The elements in Figure 5 which are similar to those of the first modification of Figure 3 will be given the same reference numerals. This would include the pivot screw 26, the angle bracket 28 and the bracket 33 which is not shown in Figure 5.

This third modification 50 has two pivoted sections 51 and 52 each of which includes a brush 53 supported on an angle bar 54. The angle bar of the scraper section 52 overlaps the angle bar of section 51 so that a pivot pin or rivet 55 may extend through the overlapped portions of the angle bars adjacent one side edge of each. A reinforcement is provided for this center connection by means of a tongue 56 of section 51 mating with the groove 57 of the section 52 when the scraper sections are in their aligned positions with the door fully opened. Both the second and third modifications of this invention have a toggle action and serve to hold the door 12 in the fully opened position so that it is necessary to first buckle the scraper sections before they will fold neatly together against the inner side of the door 12.

Having described above the details of the several modifications of my generic invention, it should be understood that the shoe scraper may be made of many different materials and shapes and that this invention is more concerned with the means for supporting the scraper between the door and door sill than it is in the design of the scraper proper. In other words, the principal contribution of this invention is in the simple constructions of the several pivotal connections which enable a foot scraper to be supported between a door and door sill of a vehicle.

Modifications of this invention will occur to those skilled in this art, and it is to be understood, therefore, that this invention is not limited to the paricular embodiments disclosed but that it is intended to cover all modifications which are within the true spirit and scope of this invention as claimed.

What I claim as new and desire to secure by Letters Patent of the United States is:

1. A shoe cleaner comprising a scraper bar and an upwardly turned brush member arranged on a supporting member, the supporting member having two vertical hinge connections, one being adapted for connection at the side of a door of a vehicle and the other being adapted for connection with the door sill of the vehicle so that the cleaner is within the vehicle when the door is closed, the supporting member being provided with an additional pivotal means so that the effective length of the supporting member between the hinged connections may be varied to accommodate the opening and closing of the said door, the scraper bar being coextensive with the brush member and substantially flush therewith.

2. A shoe cleaner comprising a scraping portion and a supporting portion, the supporting portion having two hinged connections, one being adapted for connection to the side of a door of a vehicle above the lower edge of the door and the other being adapted for connection with the top surface of the door sill of the vehicle so that the cleaner is within the vehicle when the door is closed, the supporting portion having an additional pivotal means so that the effective length of the supporting portion between the hinged connections may be varied to accommodate the opening and closing of the said door.

3. The combination of a vehicle with a collapsible shoe cleaner comprising a scraping portion and a supporting portion, the supporting portion having two vertical hinge connections, one fastened at the side slightly above the lower edge of a swinging door of the vehicle and the other fastened to the top surface of the door sill of the vehicle so that the greater portion of the cleaner is arranged outside the vehicle when the door is fully opened, the supporting portion having a pivotal means whereby the effective length of the supporting portion between the two hinge connections may be varied so as not to interfere with the opening and closing of the door, the said shoe cleaner being arranged within the vehicle closely adjacent the inner surface of the door when the door is closed.

4. A shoe cleaner comprising a scraping portion and a supporting portion, the supporting portion having two vertical hinged connections, one being adapted for connection at the side of a door of a vehicle slightly above the lower edge of the door and the other being adapted for connection with the top surface of the door sill of the vehicle so that the cleaner is within the vehicle when the door is closed, the latter connection between the supporting portion and the door sill being in the form of a vertical pin operating in an elongated slot, the pin being on one of the members and the elongated slot being on the opposite member so that the effective length of the supporting portion between the hinged connections may be varied to accommodate the opening and closing of the said door.

5. A shoe cleaner comprising a brush member fastened to a supporting plate, the plate having an upturned flange with an upper edge that rises slightly above the upper surface of the said brush to serve as a scraper bar, the support plate having two hinged connections, one being adapted for connection with the door of a vehicle slightly above the lower edge of the door and the other being adapted for connection with the top surface of the door sill of the vehicle, a longitudinally extending slot formed in the support plate and a vertically extending pintle fastened to the door sill, the underside of the said brush being recessed adjacent the slot in the support plate so that the said pintle may be arranged in the slot and move freely therein, the said pintle and slot arrangement serving as an additional piovtal means to vary the effective length of the support plate between the hinged connections during the opening and closing of the said door.

6. A shoe cleaner comprising a scraping portion and a supporting portion, the supporting portion having two universal hinge connections, one being adapted for connection at the side of a door of a vehicle slightly above the lower edge of the door and the other being adapted for connection with the top surface of the door sill of the vehicle so that the cleaner is within the vehicle when the door is closed, the scraping and supporting portions being in two sections which are hinged together about a transverse pivotal axis so that the effective length of the cleaner between the outermost hinged connections will be varied to accommodate the opening and closing of the said door.

7. The combination of a vehicle with a shoe cleaner comprising a scraping portion and a supporting portion, the supporting portion having a hinge means at each end, each hinge being pivotal about a transverse axis of the cleaner, one of the hinged connections fastened by means of a vertical pivot at the side of the door of the vehicle slightly above the lower edge of the door and the other hinged connection being fastened by another vertical pivot to the top surface of a door sill of the vehicle, the said scraping portion and supporting portion being arranged in two sections which are pivoted together about a transverse axis adjacent the underside of the cleaner so that the effective length of the cleaner between the outermost hinged connections may be varied to accommodate the opening and closing of the said door, the said shoe cleaner being arranged within the vehicle closely adjacent the inner surface of the door when the door is closed.

8. A shoe cleaner comprising a scraping portion and a supporting portion, the supporting portion having a vertical hinge connection at each end, one being adapted for connection at the side of a door of a vehicle slightly above the lower edge of the door and the other being adapted for connection with the top surface of the door sill of a vehicle so that the cleaner is within the vehicle when the door is closed, the scraping and supporting portions of the cleaner being in two sections which are pivoted together about a vertical axis adjacent one side edge thereof so that the effective length of the cleaner between the hinged connections may be varied to accommodate the opening and closing of the said door.

9. The combination of a vehicle and a collapsible shoe cleaner comprising a scraping portion and a supporting portion, a vertical hinge connection at each end of the cleaner, one hinge being fastened at the side of the door slightly above the lower edge thereof while the other hinge is connected to the upper surface of a door sill of the vehicle, the scraping and supporting portions of the cleaner being in two sections which are pivoted together along one side edge thereof about a vertical axis, the pivotal axes of the outermost hinge connections also being vertical so that the shoe cleaner will fold into the vehicle as the door is closed and hug the inner surface of the door in an inconspicuous manner.

References Cited in the file of this patent

UNITED STATES PATENTS

| | | |
|---|---|---|
| 456,085 | Curtis | July 14, 1891 |
| 1,482,399 | Inglis | Feb. 5, 1924 |
| 2,665,921 | Schetzer | Jan. 12, 1954 |
| 2,677,553 | Miller | May 4, 1954 |

FOREIGN PATENTS

| | | |
|---|---|---|
| 524,955 | Canada | May 15, 1956 |